United States Patent [19]

Fischer et al.

[11] Patent Number: 5,189,100
[45] Date of Patent: Feb. 23, 1993

[54] POLYMER BLENDS

[75] Inventors: Jens-Dieter Fischer, Bickenbach; Thomas Rhein, Stadecken-Elsheim; Manfred Stickler, Seeheim-Jugenheim, all of Fed. Rep. of Germany

[73] Assignee: Rohm GmbH Chemische Fabrik, Darmstadt, Fed. Rep. of Germany

[21] Appl. No.: 693,535

[22] Filed: Apr. 30, 1991

[30] Foreign Application Priority Data

May 18, 1990 [DE] Fed. Rep. of Germany ....... 4016011

[51] Int. Cl.$^5$ .................. C08L 33/10; C08L 25/12; B32B 27/30
[52] U.S. Cl. ..................... 525/74; 525/207; 525/221
[58] Field of Search .............. 525/73, 74, 78, 205, 525/207, 221

[56] References Cited

U.S. PATENT DOCUMENTS 4,588,774  5/1986  Dean ................. 525/73

FOREIGN PATENT DOCUMENTS

| | | |
|---|---|---|
| 0006562 | 1/1980 | European Pat. Off. . |
| 0082833 | 6/1983 | European Pat. Off. . |
| 0113105 | 7/1984 | European Pat. Off. . |
| 0194384 | 9/1986 | European Pat. Off. . |
| 0268040 | 5/1988 | European Pat. Off. . |
| 1231013 | 12/1966 | Fed. Rep. of Germany . |
| 1298272 | 6/1969 | Fed. Rep. of Germany . |
| 1950599 | 4/1971 | Fed. Rep. of Germany . |
| 2045742 | 6/1972 | Fed. Rep. of Germany . |
| 2828517 | 1/1980 | Fed. Rep. of Germany . |
| 3601423 | 7/1987 | Fed. Rep. of Germany . |
| 3631826 | 3/1988 | Fed. Rep. of Germany . |
| 60-147417 | 8/1985 | Japan . |

*Primary Examiner*—Nathan M. Nutter
*Assistant Examiner*—Jeffrey Culpeper Mullis
*Attorney, Agent, or Firm*—Oblon, Spivak, McClelland, Maier & Neustadt

[57] ABSTRACT

Polymer blends comprising:
(A) 99.5–0.5 wt. % of a copolymer comprising:
  a1) 50–99 wt. % of $C_1$–$C_{10}$-alkyl- or $C_5$–$C_8$-cycloalkylmethacrylates or mixtures thereof,
  a2) 0.5–20 wt. % of maleic acid anhydride or fumaric acid anhydride or maleimide, and
  a3) 0.5–40 wt. % of vinyl aromatics which may be unsubstituted or substituted on the aromatic ring with 1 or 2 alkyl groups of 1 to 4 carbon atoms; and
(B) 0.5–99.5 wt. % of a copolymer comprising:
  b1) 99.5–50 wt. % of styrene and/or α-methyl styrene
  b2) 0.5–50 wt. % of acrylonitrile and/or methacrylonitrile;

provide thermoplastic transparent molding compositions.

3 Claims, No Drawings

POLYMER BLENDS

BACKGROUND OF THE INVENTION

1. Field of the Invention

The present invention relates to polymer blends. More particularly, the present invention relates to blends of copolymers of alkyl(meth)acrylates with radically polymerizable carboxylic acid anhydrides and vinyl aromatics, and copolymers of styrene and/or α-methyl styrene and acrylonitrile or methacrylonitrile.

2. Description of the Prior Art

The material polymethylmethacrylate (PMMA) is a thermoplastic which exhibits valuable properties, such as transparency and high weather resistance, good processibility, etc. However, PMMA also exhibits weaknesses such as a relatively high tendency to absorb water and an impact strength that does not meet all requirements. Water absorption of PMMA, under saturation conditions (23° C.), is 2 wt. %. To reduce the water absorption, copolymerization with hydrophobic monomers such as vinyl aromatics, presents itself first. In European Published Patent Application No. 0 268 040, compatible polymer blends are described, for example, that comprise cyclohexyl(meth)acrylate-containing acrylate copolymers and α-methyl styrene-containing polymers with or without moieties of acrylonitrile or maleic acid anhydride, which are characterized by their high transparency.

Of course, copolymerization of vinyl aromatics does not guarantee a decrease in water absorption in every case. Measurements show that in the case of copolymers comprising methyl methacrylate (MMA), styrene and maleic acid anhydride in the ratio of 75:15:10 parts by weight (commercial product Plexiglas ® HW55) the saturation value of water absorption is 4 wt. %. Water absorption of this magnitude can have a negative impact during repeated, relatively extreme, dry-moist cycles, as can occur with outdoor weathering. Molded parts made of these polymers show environmental stress cracking.

For a long time the idea of improving the impact strength of thermoplastics like PMMA by mixing with elastomeric polymers has also been pursued. The requirement that the material obtained be transparent has had a limiting effect on the options for blending. Polymer blends comprising PMMA, styrene-acrylonitrile copolymers in proportion by weight (78-88):(22-12) and acrylonitrile-butadiene-styrene copolymerizates (ABS) are known from German Offenlegungsschrift 28 28 517 and 20 45 742. Instead of PMMA, copolymers of methyl methacrylate with alkyl methacrylate can also be added as mix components.

Other thermoplastic moulding compositions are known, e.g., from German Offenlegungsschrift 36 01 423. They contain 25-60 wt. % of polycarbonate, 5-40 wt. % of polyalkylene terephthalate, 2-30 wt. % of grafted rubber and copolymer comprising 10-90 wt. % of (methyl)styrene with 90-10 wt. % of (methyl)acrylic-acid, -ester or -nitrile, maleic acid-anhydride or -imide and/or glycidyl methacrylate.

Another possibility represents blends comprising 1-99 wt. % of a copolymer with the components methyl methacrylate, maleic acid anhydride and an aromatic vinyl monomer and 99-1 wt. % of a copolymer comprising 80-100 wt. % of methyl methacrylate with 0-20 wt. % of an ethylenic monomer (European Published Patent Application No. 0 113 105).

The study by R. A. Mendelson [J. Polym. Sci., Polym. Phys. Ed. 23 (10) 1975-1995 (1985)] gives a reference to compatible mixing systems based on styrene-acrylonitrile (SAN) copolymers; as a consequence of which the miscibility or the incompatibility of maleic acid anhydride-MMA-styrene copolymers with SAN copolymers is dependent on the relative maleic acid anhydride content, on the one hand, and the acrylonitrile content, on the other hand. However, only compatible mixing systems comprising styrene-MMA-maleic acidanhydride anhydride copolymers with a styrene content above 50 wt. % and styrene-acrylonitrile copolymers with a styrene content between 90 and 40 wt. % can be derived from this study so that the assumption that compatibility is based on the high proportion of styrene of the components seemed justified.

The desire for materials than can be processed like a thermoplastic and combine excellent mechanical properties with very good optical properties can be satisfied only to a limited degree with the options offered by the prior art. The materials should combine, as far as possible, high flow during processing
high impact strength and notched impact strength
transparency or a minimum of haze and
low water absorption without forfeiting, on the other hand, the desired qualities of the parent components. Thus, any possibility that allowed the use of known and commercially available copolymers would be especially interesting.

SUMMARY OF THE INVENTION

It has now been surprisingly found that methyl methacrylate-rich copolymers of the MMA-styrene-maleic acid anhydride type and styrene-acrylonitrile copolymers also form compatible blends. Thus, the present invention provides polymer blends (PM) comprising:

(A) a copolymer comprising:
  (a1) $C_1$-$C_{10}$-alkyl methacrylates, $C_5$-$C_8$-cycloalkyl methacrylates or mixtures thereof,
  (a2) maleic acid anhydride or fumaric acid anhydride, and
  (a3) vinyl aromatics which may be unsubstituted or substituted on the aromatic ring by 1 or 2 $C_1C_4$-alkyl groups, wherein the component (a1) is present in an amount of 50 to 99 wt. %, based on the total wt. of (A), the component (a2) is present in an amount of 0.5 to 20 wt. %, based on the total wt. of (A), and the component (a3) is present in an amount of 0.5 to 40 wt. %, based on the total wt. of (A); and (B) a copolymer comprising:
  (b1) styrene, α-methyl styrene or mixtures thereof, and
  (b2) acrylonitrile, methacrylonitrile or mixtures thereof,
  wherein the component (b1) is present in an amount of 99.5 to 50 wt. %, based on the total wt. of (B), and the component (b2) is present in an amount of 0.5 to 50 wt. %, based on the total wt. of (B);

wherein the copolymer (A) is present in an amount of 0.5 to 99.5 wt. %, based on the total wt. of (A)+(B), and the copolymer (B) is present in an amount of 99.5 to 0.5 wt. %, based on the total wt. of (A)+(B).

In another embodiment of the invention, the impact strength properties of the polymer blends PM may be further improved by the addition of a rubber-modified styrene copolymer (RP). Thus, the present invention also provides polymer blends comprising:

(A) a copolymer comprising: (a1) $C_1$-$C_{10}$-alkyl methacrylates, $C_5$-$C_8$-cycloalkyl methacrylates or mixtures thereof,
(a2) maleic acid anhydride or fumaric acid anhydride, and
(a3) vinyl aromatics which may be unsubstituted or substituted on the aromatic ring by 1 or 2 $C_1$-$C_4$-alkyl groups, wherein the component (a1) is present in an amount of 50 to 99 wt. %, based on the total wt. of (A), the component (a2) is present in an amount of 0.5 to 20 wt. %, based on the total wt. of (A), and the component (a3) is present in an amount of 0.5 to 40 wt. %, based on the total wt. of (A); and (B) a copolymer comprising:
(b1) styrene, α-methyl styrene or mixtures thereof, and
(b2) acrylonitrile, methacrylonitrile or mixtures thereof, wherein the component (b1) is present in an amount of 99.5 to 50 wt. %, based on the total wt. of (B), and the component (b2) is present in an amount of 0.5 to 50 wt. %, based on the total wt. of (B);
wherein the copolymer (A) is present in an amount of 0.5 to 99.5 wt. %, based on the total wt. of (A)+(B), and the copolymer (B) is present in an amount of 99.5 to 0.5 wt. %, based on the total wt. of (A)+(B); and (C) a rubber-modified styrene copolymer selected from the group consisting of ABS rubber and methyl methacrylate-modified ABS rubber;
wherein the copolymer (C) is present in an amount of 0.5 to 99.5 wt. %, based on the total wt. of (A)+(B)+(C), and the components (A)+(B) are present in a total amount of 0.5 to 99.5 wt. %, based on the total wt. of (A)+(B)+(C).

In a still further embodiment of the invention, there are provided composite materials composed of the polymer blends (PM) and other polymers. Thus, the present invention provides composites comprising: at least one first layer comprising a polymer blend comprising:

(A) a copolymer comprising:
(a1) $C_1$-$C_{10}$-alkyl methacrylates, $C_5$-$C_8$-cycloalkyl methacrylates or mixtures thereof,
(a2) maleic acid anhydride or fumaric acid anhydride, and
(a3) vinyl aromatics which may be unsubstituted or substituted on the aromatic ring by 1 or 2 $C_1$-$C_4$-alkyl groups,
wherein the component (a1) is present in an amount of 50 to 99 wt. %, based on the total wt. of (A), the component (a2) is present in an amount of 0.5 to 20 wt. %, based on the total wt. of (A), and the component (a3) is present in an amount of 0.5 to 40 wt. %, based on the total wt. of (A); and (B) a copolymer comprising:
(b1) styrene, α-methyl styrene or mixtures thereof, and
(b2) acrylonitrile, methacrylonitrile or mixtures thereof,
wherein the component (b1) is present in an amount of 99.5 to 50 wt. %, based on the total wt. of (B), and the component (b2) is present in an amount of 0.5 to 50 wt. %, based on the total wt. of (B);
wherein the copolymer (A) is present in an amount of 0.5 to 99.5 wt. %, based on the total wt. of (A)+(B), and the copolymer (B) is present in an amount of 99.5 to 0.5 wt. %, based on the total wt. of (A)+(B); and at least one second layer comprising at least one polymerizate selected from the group consisting of polymers of (meth)acrylates and polymers of styrene, the polymers of (meth)acrylates and polymers of styrene being different from the copolymers (A) and (B) of the polymer blend.

DETAILED DESCRIPTION OF THE INVENTION

In particular, methyl methacrylate is preferred as component (a1). As defined by the present invention, cycloalkyl methacrylates, in particular cyclohexyl-, in addition also cyclopentyl- and cycloheptyl- and cyclooctylmethacrylate, are also utilizable. Copolymers of different methacrylic acid esters may also be present as an option. The proportion of methacrylates (a1) in copolymer (A) is 50-99 wt. %, preferably 65 to 95 wt. %, in particular, 75±5 wt. %.

The proportion of the component (a2) ranges from 0.5 to 20 wt. %, preferably from 1-1 5 wt. %, in particular, 10±5 wt. %.

As vinyl aromatics in the component (a3) styrene and α-methyl styrene are preferred and they can be optionally substituted with one to two substituents, preferably alkyl substituents, in particular alkyl groups having 1 to 4 carbon atoms.

The proportion of component (a3) ranges from 0.5 to 40 wt. %, preferably from 1 to 30 wt. %, especially from 5-25 wt. %, in particular, 15±5 wt. %.

In general, the copolymers (A) are in the molecular weight range of $2 \times 10^4$ to $10^4$ Dalton.

Techniques for the preparation of copolymers, suitable for use as component (A), are well-known (Dutch Patent 66-05-289; German Offenlegungsschrift 12 31 013, 12 98 272 and 36 31 826; and Japanese Published Patent Application No. 85/147 417). It is conducted through radical polymerization in bulk, in solution or-less advantageously due to the tendency of the maleic acid anhydride to hydrolyze-as suspension polymerization. As the copolymer (A) commercial products are preferred, for example, those with a composition of methyl methacrylate-styrene-maleic acid anhydride in proportion by weight of 75:15:10 (Plexiglas ® HW55) or those with a composition of methyl methacrylate-α-methyl styrene-maleic acid anhydride in proportion by weight of 77:15:8 (Plex ® 8707).

The copolymers (B) can also be varied within specific limits as to their composition, i.e., 99.5-50 wt. % of styrene or α-methyl styrene monomer. Preferably, the proportion of the styrene or α-methyl styrene monomers ranges from 90-60 wt. %, in particular, 75±5 wt. %.

The copolymers suitable as the polymer component (B) are known or can be obtained according to known methods (Ullmann's Encyklopädie der Techn. Chemie, 4th edition, vol. 19, pp. 272-277, Verlag Chemie, 1989; H. F. Mark et al, Encyclopedia of Polymer Science and Engineering, 2nd ed., vol. 16, pp. 72-74, vol. 1, pp. 452-464, Wiley, 1989). They are usually prepared by radical polymerization according to well-known polymerization methods, e.g., as bulk polymerization or solution polymerization or—less favorably—in suspension. The molecular weights range from $2 \times 10^4$ to $10^6$ Dalton.

Here, too, the use of commercial products, in particular the SAN type (DIN 7728) presents itself in an advantageous manner. Examples are copolymers comprising 75 parts by weight of styrene and 25 wt. % of acrylonitrile (Luran® 368R).

The components of the polymer blends PM of the present invention are, as aforementioned, compatible in all proportions investigated. Preferred are proportions by weight of (A) to (B) of 75/25 to 25/75.

Criteria for compatibility

By compatible blends are to be understood, within the context of the present invention and in harmony with the typical ideas in the practice of polymer chemistry, stable, homogeneous blends, which exhibit macroscopically the properties of a one-phase material. (Cf. Kirk-Othmer, Vol. 18, pp. 446, 457-60; J. Brandrup and E. H. Immergut, "Polymer Handbook", 2nd edition, III-211, Wiley Interscience 1975; 3rd edition, VI/247, J. Wiley 1989).

As criteria for compatibility, in harmony with the standard texts, the following are regarded as appropriate indicia of polymer compatibility:

I) Observation of the glass transition temperature Tg

Provided the polymer components have glass transition temperatures that range far enough to be differentiated dilatometrically, dielectrically or radioluminescence-spectroscopically by means of "differential scanning calorimetry" (DSC), the existence of compatibility is shown by means of a shift or disappearance of the glass transition temperatures of the individual polymer components. (Cf. Olabisi et al. in Polymer-Polymer-Miscibility, loc. cit., pp. 21, 123.)

II) Optical Method

A film is poured from a homogeneous solution of the polymer components; upon drying, the film may not exhibit any optically perceivable inhomogeneity.

The PM polymer blends, according to the present invention, whenever tested, have exhibited, as a rule, a uniform glass transition temperature Tg and transparency.

Preparation of the PM blends

The compatible blends PM can be prepared by various methods. They can be prepared, e.g., by means of intensive mechanical mixing of components (A) and (B) in the melt, in an extruder, compounder, etc.; or they can also be prepared from a common solvent as so-called "solution cast polyblends" (cf. Kirk-Othmer "Encyclopedia of Chemical Technology", 3rd edition, vol. 18, pp. 442-478, J. Wiley 1982). As a rule blends of components (A) and (B) are produced first, where it is advantageous to start from solids in the form, for example, of granules, using slow running mixing units such as drum-, gyrowheel-, double chamber-, plough-bar mixers. The slowly running mixing units produce a mechanical mixing, without eliminating the phase boundaries (cf. Ullmann's Encyklopädie der Technischen Chemie, 4th edition, vol. 2, pp. 282-311, Verlag Chemie). Subsequently, the thermoplastic, homogeneous blend is formed by means of homogenous mixing in the melt, using heatable mixing units at suitable temperatures, e.g., 150 to not more than about 300° C. in such compounders as the Brabender compounder or preferably in an extruder, e.g., single or multi-screw extruders or optionally in extruders with oscillating screw and shear pins (e.g., in the Bussco compounder). During melt mixing, it must be observed in any event that the melt is not subjected to too high temperatures (T > 300° C.), since the polyblend tends to turn yellow. According to these methods, pellets of the same size (e.g., dieface, dice shape, round pellets) can be prepared. The size of the pellets is in a range of 2 to 5 mm.

Advantageous effects

The polymer blends PM, according to the present invention exhibit the following advantages:
- distinct reduction in melt viscosity
- distinct decrease in water absorption during saturation
- no or very slight forfeiture of heat resistance (VST-B) and the mechanical properties (impact strength (SZ), notched impact strength (KSZ))

Especially advantageous is the possibility of obtaining transparent molded parts from the polymer blends PM, e.g., by injection molding. Furthermore, the polymer blends PM offer the possibility of preparing composites—for example, one or several layers in conjunction with—optionally impact modified—polyalkyl methacrylates (Cf. Th. Völker, H. Rauch-Puntigam, Acryl- und Methacrylverbindungen, Springer Verlag 1967) and/or copolymers (A) or (B) which differ in monomeric composition, monomeric proportions or molecular weight from those in the polymer blends PM.

Another embodiment of the invention lies in the possibility of further improving the impact strength properties of the polymer blends PM with other additives.

This includes the addition of rubber-modified styrene copolymers RP, for example, of the acrylonitrile-butadiene-styrene-rubber type (ABS, cf. DIN 16772), in particular of transparent ABS rubber (cf. Ullmann, loc. cit., vol. 19, pp. 277-279, H. F. Mark et al, loc. cit., vol. 1, pp. 388-395). The effect of the elastomeric mixing component on the total system can be estimated with the aid of known mechanical and optical properties of such elastomers. The proportion of rubber-modified copolymerizates RP ranges usually from 0.5 to 99.5 parts by weight, based on the total system (PM+RP). The elastomeric component may be compounded with the blend PM utilizing the sam techniques suitable for preparation of the blend PM.

The effects thus achieved are explained in detail with the aid of a transparent ABS commercial product (ABS Terluran® TR 2802).

A polymer blend PM, according to Example 6 of the following described examples, has a haze value even better than the unmodified ABS component. Furthermore, the following properties must be highlighted:
- increased heat resistance as compared to the ABS component alone
- increased modulus of elasticity as compared to the ABS component Compared to the polymer blends PM of the polymer components (A) and (B), the aforementioned polymer blends (PM+RP) have the advantage of higher impact strength and, above all, higher light transmission.

Of special commercial interest are composite materials based on polymer blends PM with suitable polymer laminates that are different from PM.

Examples are composites, which form at least one or several layers (e.g., up to 10 layers), formed by the polymer blends PM, on the one hand, and by layers of optionally impact modified copolymerizates SC, on the other hand, selected from the group of polymers of (meth)acrylates and/or polymers of styrene, provided that the copolymers SC are different from (A) and (B), as noted above. These copolymers SC can be, e.g., polyacrylates (cf. Houben-Weyl, 4th edition, vol. E20, pp. 1141-1229, Georg Thieme Verlag, New York, 1987; H. F. Mark et al, Encyclopedia of Polymer Science and Engineering, 2nd edition, vol. 1, pp. 234-334, John Wiley 1985). Examples are blends of polymethyl methacrylate and elastomer phases, grafted with methyl methacrylate, such as cross-linked polybutylacrylate.

Such composites can be formed by adhesive and/or melt bonding of the different lamina to one another, or by coextrusion, or by other techniques known in the art.

Having generally described this invention, a further understanding can be obtained by reference to certain specific examples which are provided herein for purposes of illustration only and are not intended to be limiting unless other specified.

EXAMPLES

In the following examples, the following terms are used:

| abbrev. | unit | meaning | standard |
|---|---|---|---|
| VST-B | (°C.) | Vicat softening point | DIN 53 461 version B |
| HDT-A | (°C.) | heat distortion temperature | ISO R75 |
| SZ | $(KJm^{-2})$ | impact strength | DIN 53 453 |
| KSZ | $(KJm^{-2})$ | notched impact strength | DIN 53 453 |
| E-Modul | (M Pa) | modulus of elasticity | DIN 53 457 |
| $E_R$ | (%) | elongation at break | DIN 53 455 |
| SWA | (%) | saturation water absorption | DIN 53 427 |
| $\eta_S 220/5$ | (Pa.s) | spec. viscosity | |
| haze | (%) | haze | ASTM D 1003 |

EXAMPLES 1-5

The blends listed in the following table were compounded and pelletized from the mixing components on a 35 mm Storck mixing extruder at 220°-250° C.; injection molding took place on a Battenfeld injection molding machine (BA 350–CD) at 250° C. The mixing components were A1: a copolymer comprising methyl methacrylate-maleic acid anhydride-styrene of the composition 75-10-15 (Plexiglas ® HW55 (Röhm)) and B1: styreneacrylonitrile-acrylonitrile copolymer of the composition 75-25 (Luran ® 368 (BASF)).

Compared to pure A1 (Comparison Example 4), the blends, listed under Examples 1-3, exhibit a distinct reduction in melt viscosity and thus an improved processibility during the injection molding; and a distinct reduction in water absorption during saturation with only very little forfeiture of heat resistance (Vicat-B) and mechanical properties (impact strength and notched impact strength, modulus of elasticity).

| blend/properties | Example 1 | Example 2 | Example 3 | Example 4 (comparison) | Example 5 (comparison) |
|---|---|---|---|---|---|
| proportions | | | | | |
| A1 | 75 | 50 | 25 | 100 | 0 |
| B1 | 25 | 50 | 75 | 0 | 100 |
| Vicat-B (°C.) | 120 | 116 | 112 | 121 | 106 |
| impact strength (23° C., $KJ^{-2}$) | 21 | 21 | 20 | 10 | — |
| notched impact strength (23° C., $KJ^{-2}$) | 1.6 | 1.7 | 1.6 | 2.0 | 1.9 |
| $\eta_S 220/5$ (Pa.s) | 2,980 | 1,930 | 1,250 | 4,000 | 1,050 |
| SWA (%) | 1.37 | 1.00 | 0.74 | 2.10 | 0.58 |

EXAMPLES 6-8

The blends, listed in the following table, were compounded, pelletized and injection molded in accordance with Examples 1-5.

The mixing component SC1 was: methyl methacrylate-modified, acrylonitrile-butadiene-styrene terpolymerizate of the composition methyl methacrylate/acrylonitrile/styrene/butadiene =37/7/42/14 (Terluran ® TR 2802 (BASF)).

Compared to pure SC1, the blends, listed under Examples 6 and 7, exhibit a distinctly higher heat resistance (Vicat-B and HDT-A), a distinctly higher modulus of elasticity, and a lower haze value (and in conjunction therewith a higher transparency). In contrast, there were justifiable losses in the (notched) impact strength and in the elongation at break. The distinctly higher melt viscosity can be traced to the use of a more viscous A1 polymer which corresponds in its other properties to the A1 type that was added in Examples 1-4.

| blend/properties | Example 6 | Example 7 | Example 8 (comparison) |
|---|---|---|---|
| proportions | | | |
| SC1 | 50 | 25 | 100 |
| B1 | 20 | 30 | — |
| A1 | 30 | 45 | — |
| Vicat-B (°C.) | 112 | 115 | 100 |
| HDT-A (°C.) | 85 | 88 | 73 |
| impact strength | | | |
| (23° C., $KJm^{-2}$) | 34.7 | 28.2 | 77.3 |
| (−20° C.) | 26.3 | 23.7 | 80.3 |
| notched impact strength | | | |
| (23° C., $KJm^{-2}$) | 2.1 | 1.8 | 4.3 |
| (−20° C.) | 1.7 | 1.5 | 2.6 |
| modulus of elasticity (MPa) | 2,760 | 3,140 | 2,000 |
| elongation at break (%) | 15.7 | 6.6 | 10.1 |
| $\eta_S 220/5$ (Pa.s) | 6,320 | 4,430 | 2,310 |
| haze (%) | 1.9 | 1.6 | 2.9 |

What is claimed as new and desired to be secured by Letters Patent of the United States is:
1. A polymer blend comprising:
   (A) a copolymer comprising:
      (a1) $C_1$-$C_{10}$-alkyl methacrylates, $C_5$-$C_5$-cycloalkyl methacrylates or mixtures thereof,

(a2) maleic acid anhydride or fumaric acid anhydride, and
(a3) vinyl aromatics which may be unsubstituted or substituted on the aromatic ring by 1 or 2 $C_1$–$C_4$-alkyl groups,
wherein the component (a1) is present in an amount of 50 to 99 wt. %, based on the total wt. of (A), the component (a2) is present in an amount of 0.5 to 20 wt. %, based on the total wt. of (A), and the component (a3) is present in an amount of 0.5 to 40 wt. %, based on the total wt. of (A); and
(B) a copolymer comprising:
  (b1) styrene, α-methyl styrene or mixtures thereof, and
  (b2) acrylonitrile, methacrylonitrile or mixtures thereof, wherein the component (b1) is present in an amount of 99.5 to 50 wt. %, based on the total wt. of (B), and the component (b2) is present in an amount of 0.5 to 50 wt. %, based on the total wt. of (B);
wherein said copolymer (A) is present in an amount of 0.5 to 99.5 wt. %, based on the total wt. of (A)+(B), and said copolymer (B) is present in an amount of 99.5 to 0.5 wt. %, based on the total wt. of (A)+(B).

2. The polymer blend according to claim 1, further comprising:
(C) a rubber-modified styrene copolymer selected from the group consisting of ABS rubber and methyl methacrylate-modified ABS rubber,
wherein the copolymer (C) is present in an amount of 0.5 to 99.5 wt. %, based on the total wt. of (A)+(B)+(C), and the components (A)+(B) are present in a total amount of 0.5 to 99.5 wt. %, based on the total wt. of (A)+(B)+(C).

3. The polymer blend according to claim 2, wherein said rubber-modified styrene copolymer is transparent.

* * * * *